June 11, 1929.  J. REID  1,716,738
CLUTCH PULLEY CONTROL
Filed Nov. 8, 1926  4 Sheets-Sheet 4
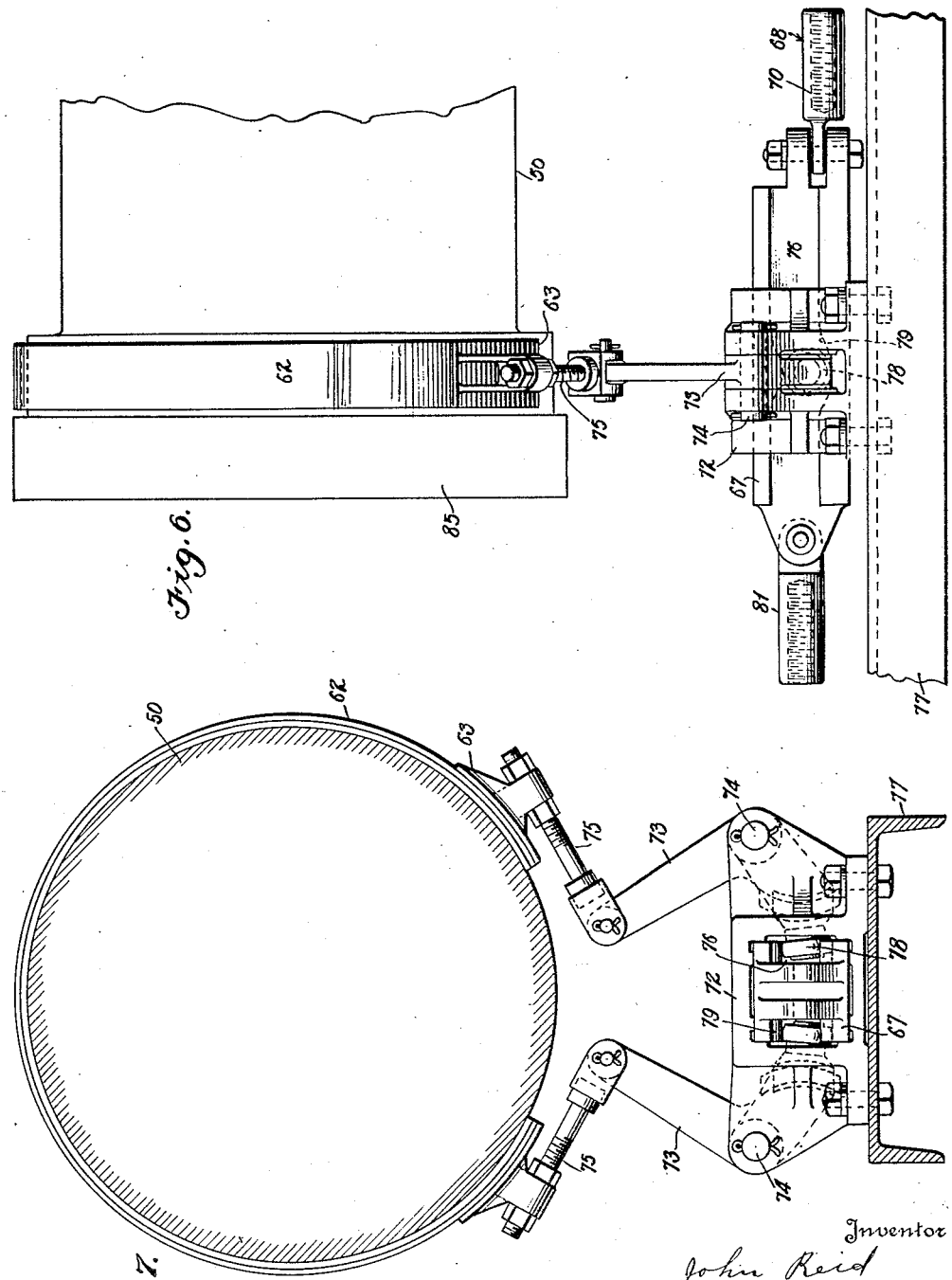

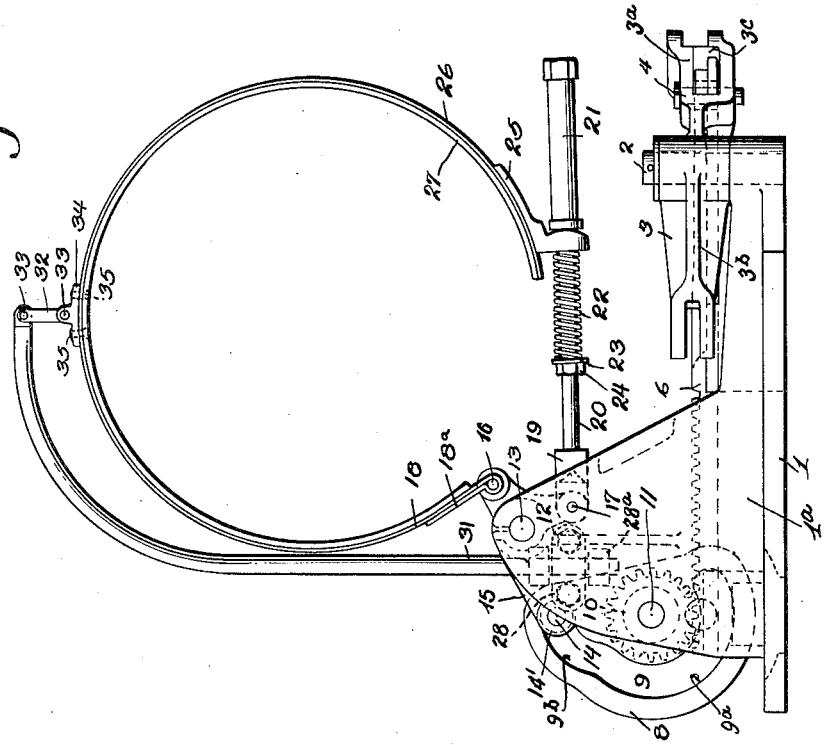
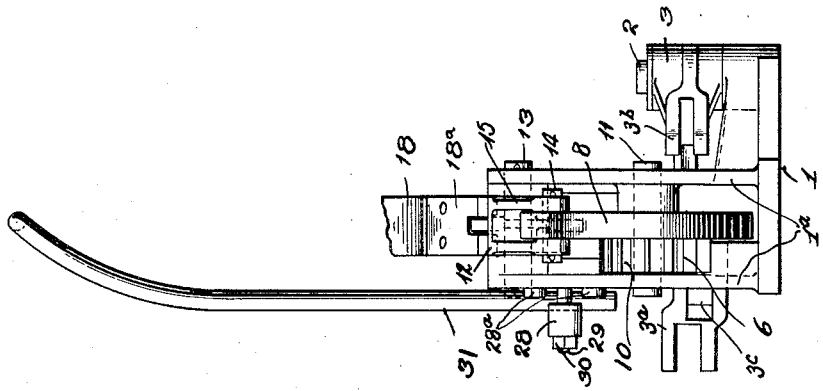

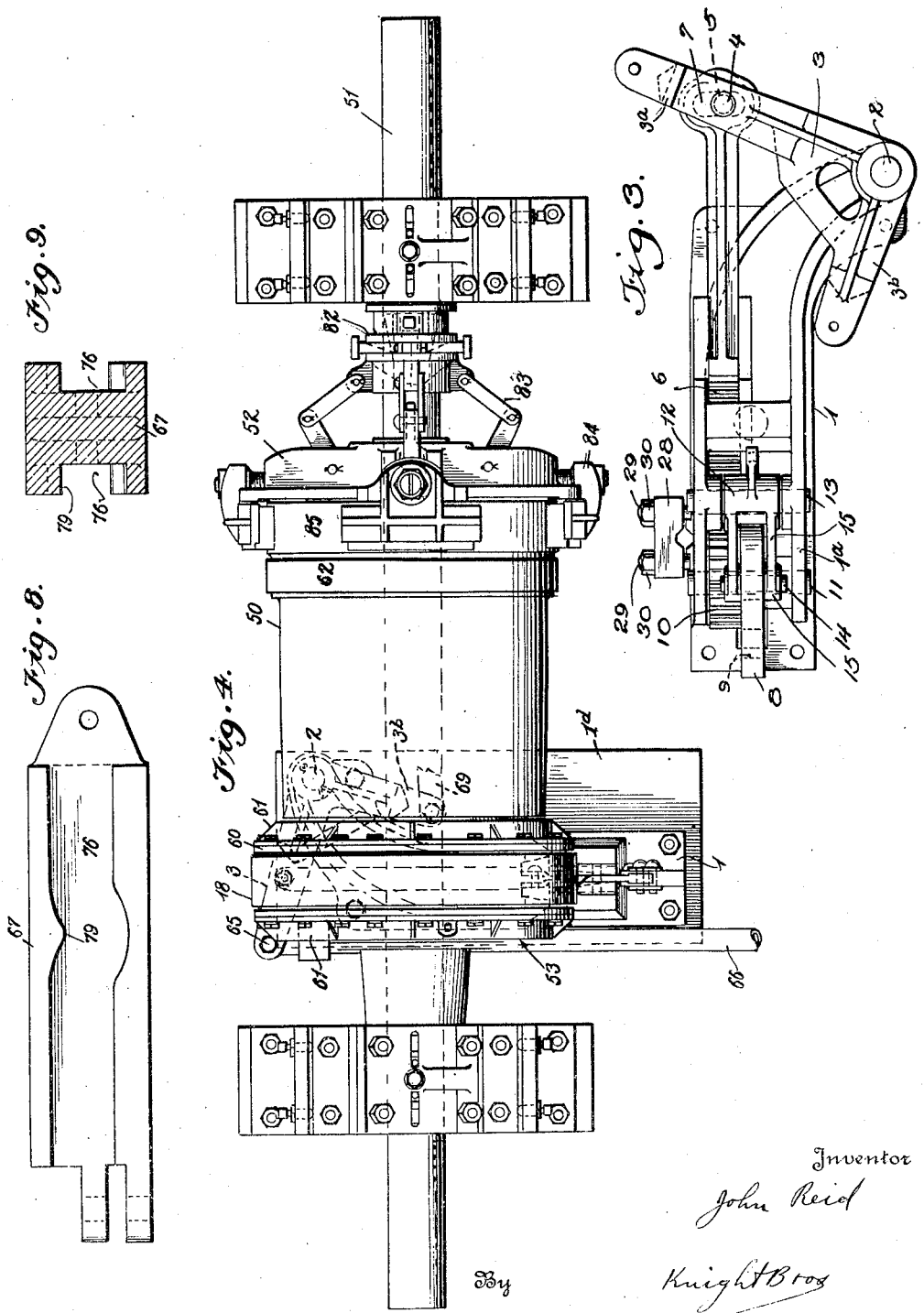

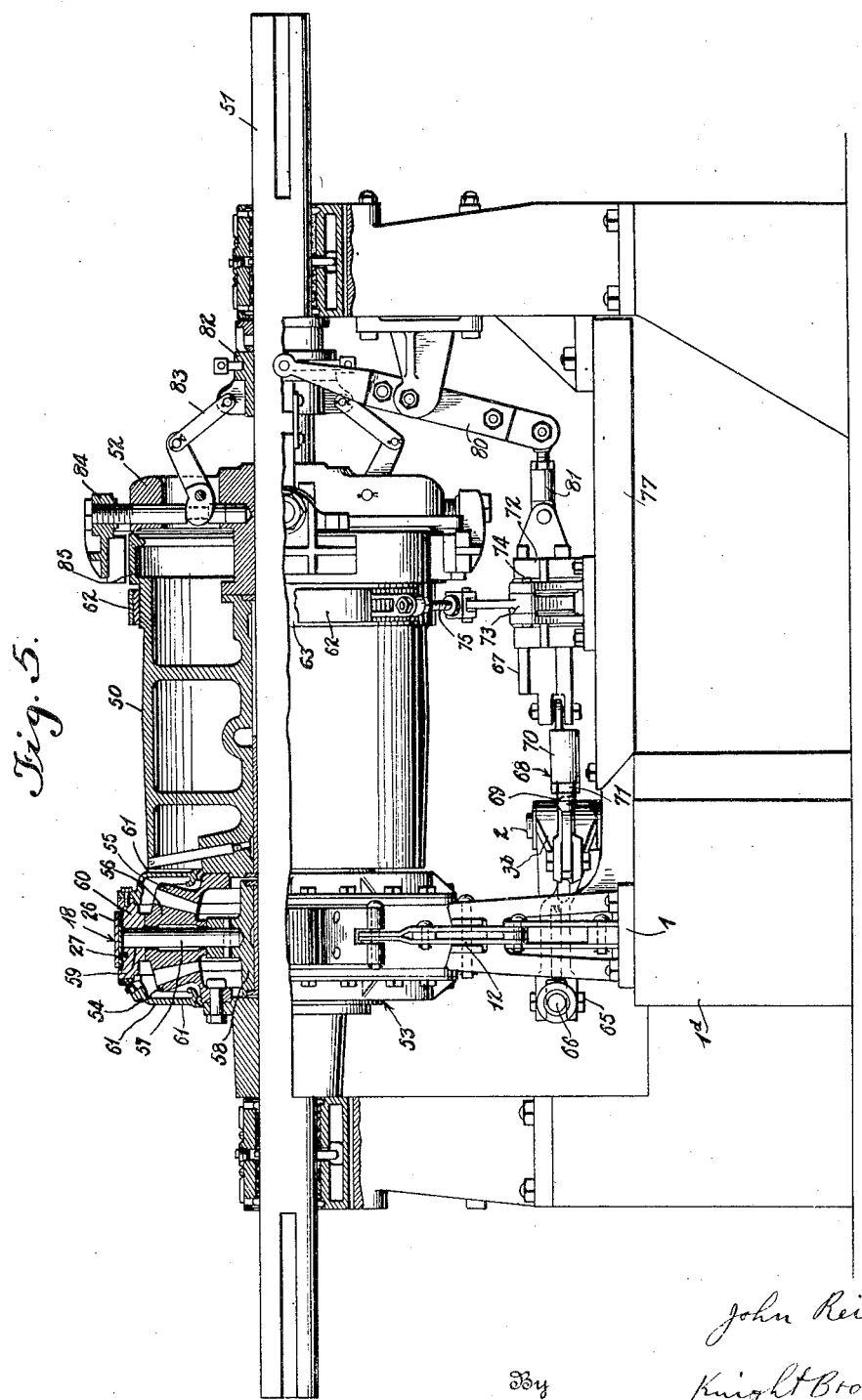

Patented June 11, 1929.

1,716,738

UNITED STATES PATENT OFFICE.

JOHN REID, OF OIL CITY, PENNSYLVANIA, ASSIGNOR TO JOSEPH REID GAS ENGINE COMPANY, OF OIL CITY, PENNSYLVANIA.

CLUTCH-PULLEY CONTROL.

Application filed November 8, 1926. Serial No. 147,118.

The present invention relates to clutch pulleys, particularly to those of the type having a clutch for coupling the pulley directly to the drive shaft for rotation in one direction, and a reversing gearing controlled by a brake for causing rotation in the opposite direction.

One object of the invention is to simplify the controlling means so that the direct clutch and reversing brake can be alternately thrown in and out by means of a single control lever.

Another object of the invention is to provide a holding brake which will be operated by the same control lever, and will maintain the clutch pulley in any desired position when the direct clutch and reversing brake are both in inoperative position.

Another object of the invention is to provide an improved means for suspending a brake band over a brake drum so that the two will be held out of engagement when the brake band is not tightened.

The invention will be described in detail in connection with the accompanying drawing in which one embodiment of the same is shown, and in which:

Fig. 1 is a front view of the reversing brake band and its control members,

Figs. 2 and 3 are side and plan views respectively of the parts shown in Fig. 1, Fig. 4 is a plan view of the clutch pulley complete, Fig. 5 is a side elevation of the same with the upper half shown in section, Fig. 6 is a detail side view of the holding brake and its control members, Fig. 7 is an end view of the same, and Figs. 8 and 9 are a detail side view and cross section respectively of the holding brake controlling cam.

Referring first to Figs. 4 and 5 it will be seen that the clutch pulley 50 is loosely mounted on a shaft 51 which is continuously rotated by means of a source of power not shown. A clutch 52 is keyed to shaft 51, and when thrown in is adapted to drive the pulley 50 in the direction in which shaft 51 is rotating. At the other end of pulley 50 a reversing gearing 53 is mounted on shaft 51. Bevel gear 54 is keyed to the shaft and bevel gear 55 is rigidly connected to pulley 50, the two bevel gears being connected by pinions 56. Said pinions are mounted on pins 57 which have one end fixed in a collar 58 loosely mounted on shaft 51, and the other end inserted in suitable apertures 59 in the brake drum 60. Casings 61 enclose the gearing. A brake band 18 cooperates with brake drum 60. When the clutch is thrown in the whole reversing gearing rotates with shaft 51. When the clutch is thrown out and brake band 18 is tightened pins 57 are held stationary, and since bevel gear 54 continues to rotate with the shaft to which it is keyed, pinions 56 cause bevel gear 55, and therewith drum 50 to rotate in a direction opposite to that of shaft 51.

The holding brake 62 is tightened upon an annular portion 63 of the pulley 50 in a manner which will be described later, the arrangement being such that the brake is thrown on when the control rod is moved to neutral position.

The common control for the clutch and the two brakes will now be described in detail. A base plate 1 is mounted on a suitable support 1$^d$ under the reversing gearing 53. Upon a pin 2 projecting upwardly from the base plate 1 is pivoted a bell lever 3 having arms 3$^a$ and 3$^b$. The extreme outer end of arm 3$^a$ is forked and provided with a pin 65 Fig. 5 to which is connected an operating rod 66 for rocking the bell lever. Arm 3$^a$ is further provided with a slot 3$^c$ into which projects the end of a rack bar 6. The end of the rack bar is provided with a slot 7 which registers with holes 5 in the arm 3$^a$ so that a pin 4 can be inserted to connect the rack bar and bell lever.

The base plate 1 has two upstanding flanges 1$^a$ between which a cam 8 is mounted on a shaft 11. A gear 10 is rigidly connected to cam 8 and engages the teeth of rack bar 6. Between the extreme upper ends of flanges 1$^a$ a three armed lever 12 is pivoted on a pin 13. One arm 15 of said lever is bifurcated and embraces cam 8. A pin 14 which extends through holes in said bifurcated end supports a roller 14′ which rides in the groove 9 of cam 8. The second arm of said three armed lever 12 is pivoted to an eye 18$^a$ on one end of brake band 18 by a pin 16. The third arm is connected by a pin 17 to the forked end 19 of a rod 20 which projects through an aperture in the cleat 25 mounted on the other end 26 of brake band 18. The cleat 25 is held between an adjusting nut 21 on the end of rod 20 and a spring 22, the other end of which abuts against a washer 23 the position of which can be adjusted by a nut 24. The brake band is provided with a lining 27.

The brake band 18 is suspended at its upper side from a bar 31, the base of which is adjustably clamped against bosses 28ª by a plate 28 which is held in position by studs 29 and nuts 30. The upper side of the brake band is provided with a cleat 34 secured by rivets 35 to the brake band. A link 32 is pivoted at its ends to bar 31 and cleat 34 by pins 33. The supporting bar 31 is adjusted vertically so that the brake band is held just clear of the brake drum when the brake is released.

As can be seen in Fig. 1 cam slot 9 consists of a long concentric portion 9ª and a short eccentric portion 9ᵇ. When cam 8 is rotated so that roller 14' rides up into the eccentric portion the brake band 18 is tightened around its drum and the direction of rotation of pulley 50 is reversed.

The arm 3ᵇ of bell lever 3 is connected to the holding brake controlling cam 67 by means of an adjustable link 68 consisting of threaded male and female members 69 and 70 respectively. A lock nut 71 holds the two members in adjusted position. The cam 67 slides in a housing 72 rigidly supported on a cross frame 77. Bell levers 73 are pivotally supported on the housing 72 by pins 74. The upper ends of bell levers 73 are connected by adjustable links 75 to the ends of brake band 62. The opposite arms of bell levers 73 project through openings in the housing 72 into the cam grooves 76 of cam 67. Rollers 78 are mounted on the ends of the bell levers to reduce friction. The cam grooves 76 have dips 79 adapted to move rollers 78 downward and rotate the bell levers 73 to tighten the brake band on its drum.

The end of cam 67 toward clutch 52 is connected to clutch operating lever 80 by an adjustable link 81 similar to link 68. Lever 80 is connected to collar 82 which is axially slidable on shaft 51, and has pivoted to it toggles 83 by means of which clutch jaws 84 are thrown into and out of engagement with the annular portion 85 of pulley 50 in an obvious manner.

The longitudinal position of cam 67 can be adjusted by means of links 68 and 81 so that the dips 79 can be timed to tighten brake band 62 when both the reversing brake and the clutch are in released position. The long concentric portion of cam 8 provides for sufficient movement of the operating rod 66 to first throw brake 62 on, and then by continued movement to throw brake 62 off and clutch 52 in. The neutral position between the action of the reversing brake and the action of the friction clutch begins before rollers 78 start to move downward in dips 79 and continues until the rollers have completed their upward movement.

Having described my invention,
I claim:

1. In a device of the kind described, a drive shaft, a pulley, a friction clutch for clutching said pulley directly to said shaft, a differential reversing gear having a brake drum, and a brake band cooperating therewith, means for operating said clutch, and a cam for controlling said brake operable by said clutch operating means, said cam having a neutral position, an eccentric curve on one side of said neutral position for tightening said brake band, and a concentric curve on the other side of said neutral position for permitting the throwing in of said clutch without affecting said brake.

2. In a device of the kind described a constantly rotating shaft, a pulley rotatably mounted on said shaft, a clutch for coupling said pulley to said shaft, reversing gearing for said pulley, a cam, a clutch operating member connected to said cam, a follower for said cam, and connections between said follower and said reversing gearing for controlling the latter, said cam having a short protruding surface for operating said reversing gearing, and a long even surface for permitting operation of said clutch without effect upon said reversing gearing.

3. In a device of the class described a constantly rotating shaft, a pulley rotatably mounted on said shaft, a clutch for coupling said pulley to said shaft, reversing gearing for said pulley, a brake for holding said pulley stationary, a common control for said reversing gearing and said clutch having a reversing position, a clutch operating position, and an intermediate neutral position, and means actuable by said common control in its neutral position for actuating said brake.

4. In a device of the class described a constantly rotating shaft, a pulley rotatably mounted on said shaft, a clutch for coupling said pulley to said shaft, reversing gearing for said pulley, a brake for holding said pulley stationary, a common control for said reversing gearing and said clutch having a reversing position, a clutch operating position, and an intermediate neutral position, said common control including a rectilinearly movable cam, a member operated by said cam, connections between said member and said brake, and means for adjusting the longitudinal position of said cam, whereby the movement of said member may be timed to coincide with the neutral position of the common control.

In testimony whereof the foregoing specification is signed.

JOHN REID.

DISCLAIMER 1,716,738.—*John Reid*, Oil City, Pa. CLUTCH-PULLEY CONTROL. Patent dated June 11, 1929. Disclaimer filed November 7, 1932, by the assignee, *Joseph Reid Gas Engine Company*.

Hereby enters this disclaimer to that part of the claim in said specification which is in the following words, to wit:

"3. In a device of the class described a constantly rotating shaft, a pulley rotatably mounted on said shaft, a clutch for coupling said pulley to said shaft, reversing gearing for said pulley, a brake for holding said pulley stationary, a common control for said reversing gearing and said clutch having a reversing position, a clutch operating position, and an intermediate neutral position, and means actuable by said common control in its neutral position for actuating said brake."

[*Official Gazette December 6, 1932.*]